May 21, 1957     F. A. BARNES ET AL     2,793,300
ROLLING MOMENT COMPUTER FOR A FLIGHT SIMULATOR
Filed July 2, 1953
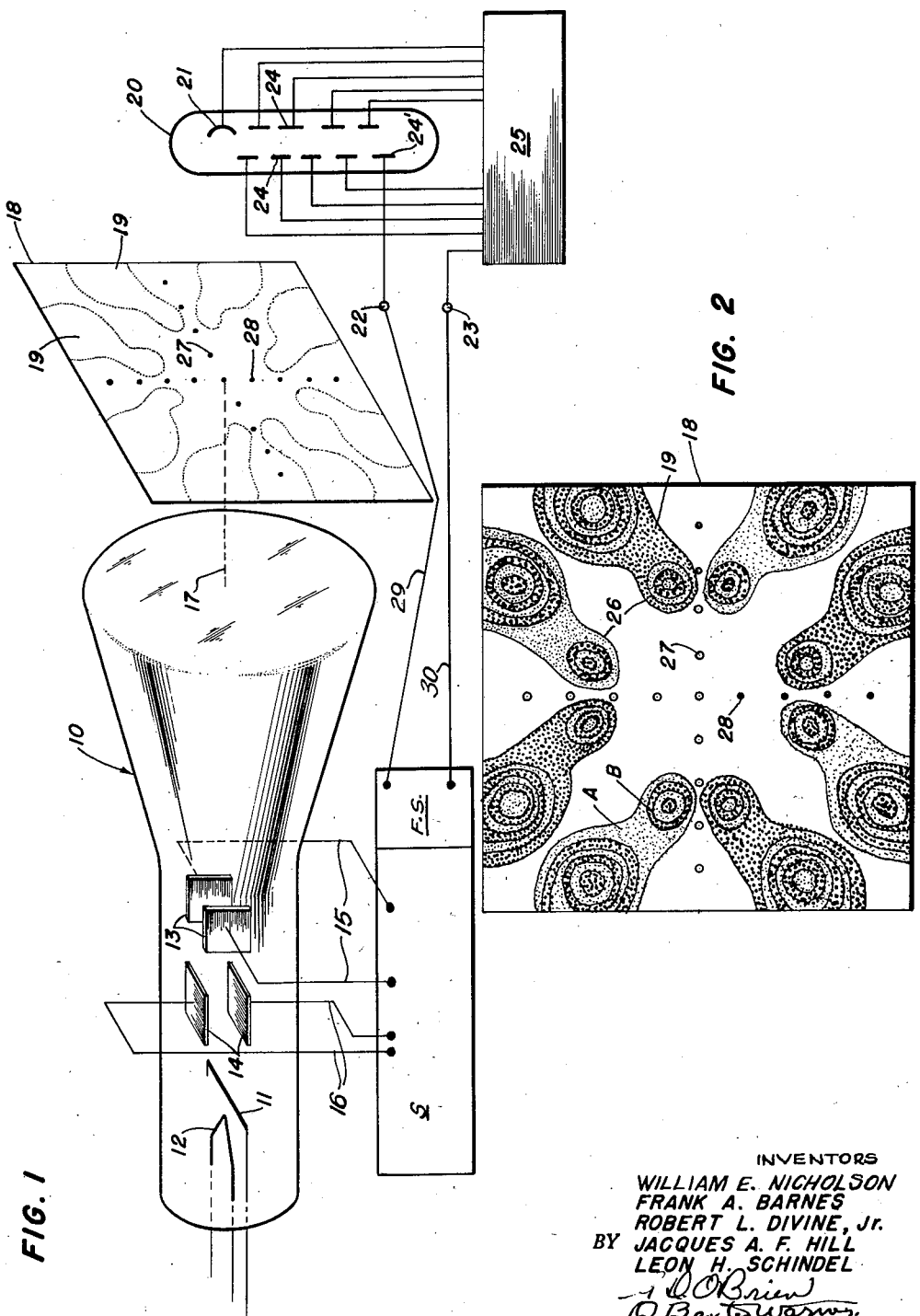
INVENTORS
WILLIAM E. NICHOLSON
FRANK A. BARNES
ROBERT L. DIVINE, Jr.
BY JACQUES A. F. HILL
LEON H. SCHINDEL
ATTORNEYS United States Patent Office 2,793,300
Patented May 21, 1957

2,793,300

ROLLING MOMENT COMPUTER FOR A FLIGHT SIMULATOR

Frank A. Barnes, Waltham, Robert L. Devine, Jr., Milton, Jacques A. F. Hill, Brookline, Leon H. Schindel, Concord, and William E. Nicholson, Reading, Mass., assignors, by mesne assignments, to the United States of America as represented by the Secretary of the Navy Application July 2, 1953, Serial No. 365,646

3 Claims. (Cl. 250—237)

This invention relates to an electrical circuit responsive to input signals corresponding to selected values of the independent variables of a given mathematical function for deriving an output signal representative of the value of the dependent variable of said function, and more particularly to a rolling moment computer for a flight simulator wherein electrical signals representing varying values of pitch and yaw of a guided missile in simulated flight are continuously combined and modified according to a preselected function thereof to produce an output signal the instantaneous value of which is indicative of the missile rolling moment corresponding to the instantaneous conditions of pitch and yaw.

The complexity of present day guided missiles requires that numerous flight tests be conducted during the development thereof in order that a determination may be made as to the effect of the missile components on the flight characteristics of the missile as a whole. Because of the great expense involved in the construction and actual flight testing of such missiles, and since flight testing results in damage to, or destruction of, the missile, there have been evolved various devices for simulating the flight of a missile. By means of such flight simulators, the various flight characteristics of a missile and the effect of various components on such characteristics may be determined in a laboratory with a resultant reduction in the time involved and the overall cost of the development program.

The present invention relates to one component of such a flight simulator, namely a circuit for deriving an electrical signal, the magnitude of which is proportional to the rolling moment of a missile for varying conditions of pitch and yaw at a selected mach number. The derived signal is supplied to the simulator along with signals representing other flight characteristics of the missile to be interpreted into the simulated flight program. Flight simulators have heretofore incorporated various mechanical or electrical arrangements for supplying rolling moment information, but the development of present day electronic simulators has necessitated components, and more particularly rolling moment computers, which are capable of supplying information at a greater rate than was possible with the prior arrangements. This invention, therefore, seeks to overcome the faults of the prior arrangements by providing an apparatus capable of supplying roll moment information at the high rate of speed required by the electronic simulator.

Accordingly, it is an object of the present invention to provide an arrangement for modifying electrical signals according to a selected mathematical function.

Another object of this invention is to provide an apparatus for deriving a signal having a magnitude related to the value of the dependent variable of a selected mathematical function.

Yet another object is to provide a device responsive to input signals representing the independent variables of a selected mathematical function for producing a signal having a magnitude indicative of the value of the dependent variable of such function.

A further object is to provide an apparatus for facilitating the computation of rolling moments of a guided missile in simulated flight.

Another object of this invention is to provide a rolling moment computer responsive to input signals proportional to varying conditions of pitch and yaw for providing an output signal proportional to the rolling moment of a missile in simulated flight for the given conditions of pitch and yaw at a predetermined mach number.

Still a further object is to provide a mask having areas of varying transparency for use in a rolling moment computer.

Other objects and many of the attendant advantages of this invention will be readily appreciated as the same becomes better understood by reference to the following detailed description when considered in connection with the accompanying drawings wherein:

Fig. 1 is a view, partly in perspective, showing broadly the arrangement of the component parts of this invention; and Fig. 2 is an enlarged detail view of the transparent mask shown in Fig. 1.

Referring now to the drawings, wherein like reference numerals designate like parts in the several views, and more particularly to Fig. 1 wherein there is illustrated one preferred physical embodiment of the present invention, 10 designates a cathode ray tube comprising a transparent envelope containing the usual elements of which only the cathode 11, the filament 12 for heating the cathode, and the beam deflection elements or plates 13 and 14 are illustrated. The electrons emitted from the heated cathode 11 are attracted toward an anode not shown and focused into a beam by means also not illustrated whereupon the beam passes between the two pairs of deflection plates 13 and 14, having input conductors 15 and 16 respectively, and impinges on the screen 17. Conductors 15 and 16 are connected to suitable yaw and pitch output terminals of a pitch and yaw simulator S. The screen 17 is, in the conventional manner, supplied with a coating of fluorescent material whereby a luminous spot is produced at the point where the electron beam strikes the screen. The application of potentials to the deflection plates 13 and 14 will, in the well-known manner, cause the electron beam to be deflected in accordance with the potentials so applied with the result that the luminous spot formed on the fluorescent screen may be caused to move from one point to another point on said screen by the proper variation of said potentials.

Positioned in front of, and preferably immediately adjacent to, the screen 17 is a transparent mask or screen 18 having formed thereon areas 19 of varying transparency which areas are for a purpose and are formed in a manner to be hereinafter described. The plane of the mask 18 is substantially parallel to the screen 17 of the cathode ray tube whereby the brightness of the illuminated spot formed on the screen 17, as seen through the mask, is dependent upon the position of the spot on the screen 17 which position is determined by the potentials existing across the deflection plates 13 and 14. The dimensions of the mask are such as to conform substantially to the size of the screen 17.

A third element comprising a photoelectric cell 20 is positioned a distance from the mask 18 on the side thereof opposite to the cathode ray tube, the arrangement being such that light from the luminous spot, after passing through the mask, impinges upon the photosensitive cathode 21 of the photoelectric cell whereby a potential will be created across the output terminals 22 and 23 of the photocell in accordance with the intensity of the light received thereby. The photoelectric cell 20 is preferably of the electron multiplier type which includes in addition to the photosensitive cathode 21 a plurality of dynodes 24 which in the conventional manner are supplied from a D. C. voltage source 25 with gradually increasing potentials whereby the electrons emitted by the cathode 21 successively strike each of the dynodes at a higher potential, releasing an increasing number of electrons therefrom so that the output current of electrode 22 is greatly multiplied as compared with that of a simple photoelectric cell. Output terminal 22 is connected to the last dynode 24' and output terminal 23 is connected to the positive terminal of the D. C. voltage source 25. Although the photoelectric cell 20 is, for convenience, shown as being disposed relatively near to mask 18, the distance between the photoelectric cell and the mask in actual practice must be such that all the points on the mask are substantially the same distance from the photosensitive cathode 21 of the cell.

It is clear from the description thus far given that when the cathode ray tube 10 is energized and constant potentials are applied to the input conductors 15 and 16 of the deflection plates 13 and 14, the luminous spot formed on the screen 17 will be deflected to a given position on said screen, and the output voltage across terminals 22 and 23 of the photoelectric cell 20 will have a value dependent upon the opacity of the particular area of the mask through which the light beam passes from the deflected luminous spot to the photocell. The output potential of the photocell can thus be made to vary by varying the potentials applied to the deflection plates 13 and 14 of the cathode ray tube in such a manner as to cause said light beam to pass through areas of said mask of greater or less opacity. It is clear, therefore, that if the mask 18 is properly shaded and the system is properly calibrated, the output signal of the photocell may be made to be proportional to the value of a selected function of the variables represented by the signals applied to the deflection plates 13 and 14 of the cathode ray tube. That is, if the mask is made to represent a graph of said function wherein the transparency of said mask at any given point, having for its coordinates given values of the independent variables of said function, is related to the value of the function at said point and the input potentials to the deflecting elements of the cathode ray tube are made such as to deflect the luminous spot to a point on said screen opposite a point on said mask whose coordinates correspond to the values of the variables represented by said potentials, the phototube output will be related to the value of the function corresponding to the values of the input variables. Thus if the strength of the input signal to deflection plate 13 is designated as $x$ and the strength of the input signal to deflection plate 14 is designated as $y$ the strength of the output signal of the photoelectric cell may be made proportional to $f(x,y)$.

Referring now to Fig. 2 there is illustrated a detailed view of the transparent screen or mask employed in the disclosed embodiment of the present invention. The particular form of mask illustrated in Fig. 2 is intended for employment in the present invention when the latter functions as a rolling moment computer for use in a flight simulator and the mask will be described in accordance with such use. It is to be understood, however, that such mask may assume numerous other forms, depending upon the particular purpose for which this invention may be employed, as will hereinafter be set forth.

The transparent mask illustrated is prepared in the following manner. Using test or theoretical data, the variations of roll data of a missile, for example, with mach number are predictable. A graph can be plotted in terms of functions of pitch and yaw covering, by predetermined increments, the entire rolling moment function at a given mach number. Such a graph, in its final form, includes closed contour lines and coordinate axes arranged in a manner similar to the arrangement of the contour lines 26 and axes 27 and 28 illustrated in Fig. 2. The mask of the present invention comprises a photographic negative which, by the use of shading masks and controlled exposures, is made to contain contour lines identical to the plotted graph and wherein whole areas representing, within predetermined limits, a given value of rolling moment are of differing constant densities. In Fig. 2 the areas of substantially constant value of rolling moment are shaded in varying manners to indicate areas of different constant opacity. Thus, for example, area A indicates an area of one value of rolling moment while area B indicates an area of another value of rolling moment. It should be clear from the above description that the mask may be prepared by methods other than that recited, as for example by overlaying a transparent screen with transparent sections of different opacity or the mask may be prepared with areas having different capacities to reflect light and the photoelectric cell may be arranged to receive reflected rather than transmitted light. Further it is clear that the contour lines may be made to correspond to a wide variety of functions. Thus, for example, a graph of any function of three variables may be plotted in terms of the independent variables for varying preassigned values of the dependent variable to provide a plurality of contour lines. The screen or mask is then prepared by forming thereon areas of different light absorbing capacities or transparency, the perimeters of which areas conform to said graph, and the light absorbing capacity or transparency of which areas is varied in accordance with the predetermined values of the dependent variable. Whole areas of a given value, within predetermined limits, of the dependent variable are of constant light absorbing capacity or transparency. It is also apparent that the mask may be prepared otherwise than by plotting the graph of the function for varying preassigned values of the dependent variable, which method results in sharply defined areas. Thus, the opacity of the mask may be gradually and continuously varied in accordance with variations in the value of the dependent variable over a wide range of values of the independent variables.

It is believed that the operation of the present invention may now be fully understood. Thus, the transparent screen or mask 18 having formed thereon the above described shaded areas is positioned in front of and immediately adjacent to cathode tube screen 17 with the intersection of the coordinate axes positioned on the cathode ray tube axis, or in other words on the axis of the electron beam with no potentials applied to the deflection plates 13 and 14. A voltage having a magnitude proportional to the value of pitch of the missile, or other aerodynamic body, at one match number and a voltage having a magnitude proportional to the value of yaw of the missile at the same mach number are applied to input conductors 15 and 16 respectively of the deflection plates 13 and 14. Assuming, for the moment, that these input voltages are constant, the electron beam and hence the luminous spot formed thereby will be deflected from the tube axis, and the light beam emanating from this spot and impinging on the photo sensitive cathode 21 of the photo cell 20 will be varied in intensity in accordance with the transparency of the mask at the particular point where it passes therethrough. The intensity of light striking the photo sensitive cathode 21, and hence the photo cell output voltage at terminals 22 and 23, will thus be related to the density of the negative at any given point and therefore to the intensity of the roll moment for the given conditions of pitch and yaw as represented by the input voltages to the deflection plates. The output voltage from the photo sensitive cell, which voltage is as set forth above related to the intensity of the roll moment at a given mach number for given conditions of pitch and yaw, is fed into the flight simulator FS via conductors 29 and 30 to be interpreted by the flight simulator into the simulated flight program of the missile. When the conditions of pitch and yaw, and hence the potentials applied across the deflecting plates, are varying the amount of light received by the photo cell, and therefore the photo cell output voltage, varies continuously in accordance with the varying transparency of the mask scanned by the luminous spot. Since the electron beam may be continuously deflected by varying amounts at an exceedingly high rate of speed, it will be appreciated that the present invention provides an apparatus capable of supplying roll moment information at the great speed required by the present day electronic simulator.

From a practical point of view it is clear, of course, that the device must be calibrated so that the input signals applied to the cathode ray tube beam deflecting elements are such that the deflections of the luminous spot will be on the same scale as are the coordinate axes on the mask. Further the relationship between the transparency of the several areas, the values of the dependent variable represented thereby, the brightness of the luminous spot, and the voltage produced by the photoelectric cell in response to light received from said spot must be determined so that a proportionality may be established between the output voltage of the photoelectric cell and the value of the dependent variable corresponding thereto.

Obviously many modifications and variations of the present invention are possible in the light of the above teachings. It is therefore to be understood that within the scope of the appended claims the invention may be practiced otherwise than as specifically described.

What is claimed is:

1. A mask to be used in a rolling moment computer for a flight simulator comprising a transparent screen having areas of different constant opacities whose perimeters conform to a graph plotted in terms of pitch and yaw for varying preassigned values of rolling moment, the opacity of said screen varying in accordance with the value of the rolling moment.

2. A roll moment computer comprising, a pitch and yaw simulator producing output electrical signals proportional to the pitch and yaw characteristics of an aerodynamic body in simulated flight, a cathode ray tube arranged to receive upon respective pairs of deflection plates the output signals from said simulator, a photographic negative of varying density formed to contain graphical areas of constant density corresponding to roll moments of known pitch and yaw characteristics, said negative being mounted outside said cathode ray tube and in the beam path therefrom, a photomultiplier tube placed in the beam path of said cathode ray tube and separated therefrom by said negative to receive light of varying intensity from said beam passing through said negative, the output voltage of said photomultiplier tube being of a value corresponding to the difference between known and simulated pitch and yaw.

3. In a flight simulator roll moment computer, a cathode ray tube having two pairs of deflection plates arranged in quadrature, a source of electrical signals representing pitch and yaw, one of said pairs of deflection plates being connected to said pitch signals, the other of said pairs of deflection plates being connected to said yaw signals, a light intensity sensing means disposed adjacent the screen of said cathode ray tube, and a mask interposed between said sensing means and said cathode ray tube comprising a transparent screen having areas of different constant opacities whose perimeters conform to a graph plotted in terms of pitch and yaw for varying preassigned values of rolling moment, the opacity of said screen varying in accordance with the value of the rolling moment.

References Cited in the file of this patent

UNITED STATES PATENTS

| | | |
|---|---|---|
| 2,183,717 | Keall | Dec. 19, 1939 |
| 2,199,066 | Bernstein | Apr. 30, 1940 |
| 2,474,380 | Simmon | June 28, 1949 |
| 2,489,883 | Hecht | Nov. 29, 1949 |
| 2,523,328 | Ranks | Sept. 26, 1950 |
| 2,704,644 | Good et al. | Mar. 22, 1955 |